Nov. 4, 1924.  1,513,745
D. T. DAY
PROCESS OF PREPARING MINERAL WAX
Filed Jan. 15, 1921
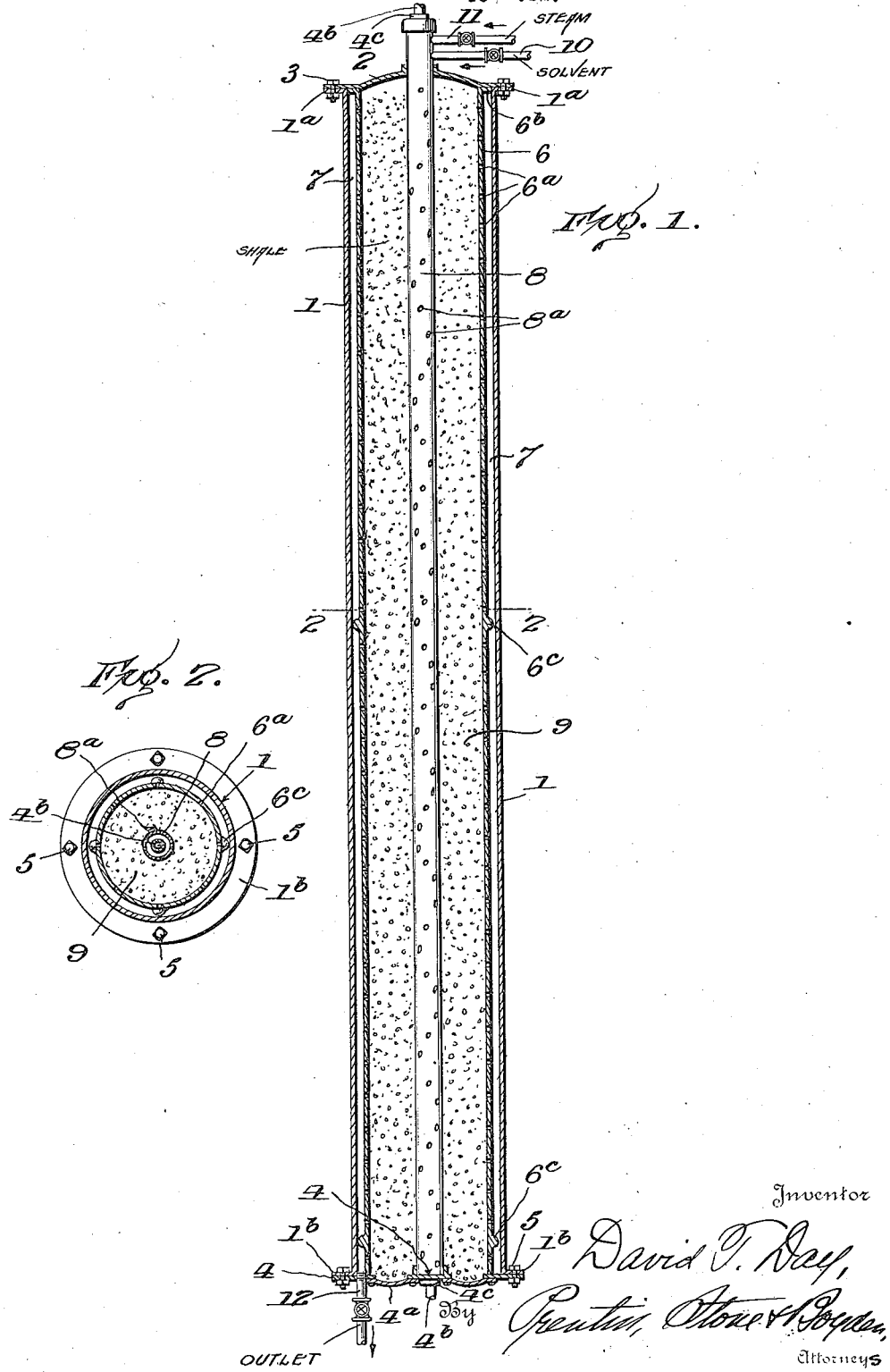

Patented Nov. 4, 1924.

1,513,745

UNITED STATES PATENT OFFICE.

DAVID T. DAY, OF WASHINGTON, DISTRICT OF COLUMBIA.

PROCESS OF PREPARING MINERAL WAX.

Application filed January 15, 1921. Serial No. 437,418.

*To all whom it may concern:*

Be it known that I, DAVID T. DAY, a citizen of the United States, residing at Washington, in the District of Columbia, have invented certain new and ueful Improvements in Processes of Preparing Mineral Wax, of which the following is a specification.

This invention relates to waxes and to processes of extracting mineral waxes from earthy materials containing the same. The invention also relates to the formation of an artificial fuel formed incident to the process of extracting natural waxes and resins from shale containing the same in nature.

One object of the invention is to provide a mineral wax having an unusually high melting point.

Another object of the invention is the extraction of a wax having an unusually high melting point from native shale by an inexpensive process in which the extraction materials may be re-used for subsequent batches of fresh material.

Another object of the invention is to provide a new fuel compound formed as an incident to the extraction of mineral waxes and resins from native shale.

The invention has disclosed the fact that certain oil shales, and particularly those found near Elko, Nevada, have substantial amounts of mineral wax and resin which have infiltrated into the rock or earthy material and may be obtained in substantially pure condition by following the process outlined hereinafter. When such shale is in a fairly dry condition and is reduced into small fragments, such as may pass through a ten mesh sieve, and then boiled in alcohol, it is found that the alcohol has dissolved out a paraffin-like substance which may be collected and used. This is done by removing the alcoholic solution with the dissolved material from the shale, decanting or filtering the solution, permitting the solution to cool and thus precipitating the paraffin-like substance, and subsequently separating the resultant precipitate from the solvent. The cold alcohol is suitable for use on another batch of material in the same manner as used for the first batch, and the same alcohol may be re-used many times. When the precipitate is distilled to drive off any remaining alcohol, a light waxy substance containing substantial amounts of ozokerite is left behind. This waxy substance has the unusually high melting point of at least 150° F., and varies to 165° F. If the alcohol is not distilled off, as just mentioned, the cold precipitate will be found to contain alcohol combined with resin and paraffin in the form of an alcohol solid emulsion suitable for use as a fuel, being both conveniently and cleanly handled and possessing great fuel value.

The process has been successfully conducted in a relatively simple form of apparatus which is illustrated in the accompanying drawing in which:

Figure 1 represents an elevation in section illustrating the relative position of the parts, and Figure 2 is a cross section taken on the line 2—2 of Figure 1 looking downward.

Referring in detail to the drawing, the apparatus is formed by an upright cylinder 1 which may have the dimensions ten feet long and fourteen inches in diameter. The top of the cylinder 1 is provided with an outwardly extending flange 1ª adapted to receive a cover plate 2 secured by fastening bolts 3. The lower end of the cylinder 1 has a corresponding flange 1ᵇ adapted to have a lower cover plate 4 placed thereon and secured by fastening bolts 5. In the cover plate 4 are suitable openings covered by small cover plates 4ª. In the interior of the apparatus is a second cylindrical member 6 extending the full length of the apparatus and spaced from the cylinder 1 so as to provide the annular space 7. This cylinder 6 may be twelve inches in diameter and ten feet long and is necessarily perforated with a plurality of openings 6ª, the purpose of which will be described hereinafter. At the top of the member 6 is an outwardly extending flange 6ᵇ which serves to space the upper end centrally within the cylinder 1. At suitable points along the length of the apparatus are suitable spacing lugs 6ᶜ illustrated as secured to the cylinder 6. These lugs serve to maintain the annular space 7 uniform around the cylinder 6. In the center of the apparatus is a small tube of approximately three inch bore indicated by the numeral 8 and preferably extending the length of the cylinders 1 and 6 and slightly beyond one end thereof. This inner tube 8 is also provided with a plurality of perforations 8ª and is centrally positioned with respect to the cylinders 1 and 6 by suitable fastenings at the bottom and at the top by extending through the center of the cover plate 2. The annular space between the central tube 8 and the cylinder 6 is indicated by 9 and is adapted to be filled with shale. At the top of the structure is a pipe 10 leading into the tube 8 for the introduction of solvent, and a second pipe 11 for the introduction of steam. A second steam pipe 4$^b$ which is imperforate extends through the top 2, downwardly through the tube 8, and out through the lower plate 4. Lock means 4$^c$ are provided on the pipe 4$^b$ to make fluid tight connections with the cover plates 2 and 4. At the base of the structure is a drain pipe 12 inserted through the lower cover plate 4 and communicating with the annular space 7.

The apparatus may be used to conduct the process of extraction according to the following steps of operation. The annular space 9 is poured full of shale crushed to about one-half inch and smaller. The cover plate is closed and the valve in the drain pipe 12 is closed. Solvent is introduced through the pipe 10 and fills the tube 8, passing through the openings 8$^a$ and saturating the shale in the space 9. Steam is then passed through the imperforate pipe 4$^b$ heating the solvent which surrounds the pipe and, serving to boil the solvent and thus facilitate the operation of dissolving the soluble material from the shale. If the solvent is gasoline and hence not subject to dilution by condensed steam, as in the case of alcohol, steam may be admitted directly to the material through the pipe 11 and into the tube 8, passing through the perforations 8$^a$ into the shale, thus boiling the solvent therein, and serving also to drive the solvent and extracted material from the shale. The extracted matter and solvent pass through the perforations 6$^a$ into the annular space 7 and may be withdrawn through the pipe 12. After a batch of shale has been treated the lower plate covers 4$^a$ may be opened and the shale removed from the space 9 and the process repeated.

The process provides for the heating of the solvent at least to its boiling point to facilitate the extraction of soluble material from the shale. After extraction the material drawn from the pipe 12 is cooled to precipitate a material which is chiefly resin and paraffin and which will contain a small proportion of solvent, which latter may be distilled off and recovered. The major portion of the solvent is freed during the cooling and precipitation.

Ninety-five per cent alcohol has been used with success and re-used as many as twelve times on successive batches of shale. When alcohol is used the extracted matter is a resin mixed with paraffin wax, if Nevada shale is used.

Other solvents than alcohol may be used. If gasolene or kerosene is used the shale gives up all soluble matter and the general product is oil. When kerosene or gasoline is used as the solvent the paraffin wax will separate out under proper conditions of freezing. That is, paraffin wax and resin are both very insoluble in gasoline or kerosene, cooled below the freezing point of water. When gasoline is used as a solvent it is usually used under pressure to prevent bringing it to the boiling point and yet have it about as hot as the boiling point of water.

The separation of the resin and the wax may be accomplished by dissolving a mixture of the two substances in hot gasoline and permitting the gasoline and dissolved material to cool slowly, the result being that the resin will crystalize out of the mixture, leaving the wax in solution in the gasoline. Such treatment indicates that the resin has a melting point varying from 165° F. to 170° F.

It is preferable that the materials taken from the pipe 12 be filtered while hot. The process includes the feature of heating by steam, or other vapor, which is economical and serves to raise the temperature of the solvent to the boiling point, and the subsequent cooling of the material taken from the pipe 12 serves to precipitate a large proportion of the material extracted. The apparatus may be provided with necessary gaskets in order to maintain a tight structure so that the pressure may be raised in order that the boiling point of the solvent may be raised. Increased pressure is not absolutely necessary but has effected economy.

What I claim is:

1. The process of extracting paraffin-like wax materials from hydrocarbon oil bearing shale which process comprises immersing the shale in a bath of a boiling solvent material characterized by its ability to substantially completely separate from the paraffin-like material when the latter cools, and is thereafter immediately reusable on fresh shale, extracting the waxy material by the solvent action alone, separating the solvent and extracted material from the shale, and separating the solvent from the extracted material by cooling the mixture to a point below the solidifying temperature of the wax.

2. The process of extracting paraffin-like wax materials from hydrocarbon oil bearing shale, which process comprises immersing the shale in a solvent bath and heat treating at a temperature of at least the boiling point of the solvent and extracting the waxy material by the action of the solvent alone, separating the solvent and extracted matter from the shale, cooling the resultant liquid material to effect the solidification of the wax, and separating the solvent from the solidified extracted material, the solvent being characterized by its ability to substantially completely separate from the paraffin-like wax material, when the latter cools and to thus be thereafter immediately reusable on fresh shale.

3. The process of extracting paraffin-like waxy materials from hydrocarbon oil bearing shale, which process comprises immersing the shale in a hot bath of ethyl alcohol, and extracting the waxy material by the solvent action of the alcohol alone, separating the alcohol and extracted material from the shale, and separating the alcohol from the extracted material by cooling the mixture to a point below the solidifying temperature of the wax, the solvent alcohol being characterized by its ability to substantially completely separate from the paraffin-like wax material, when the latter cools and to thus be thereafter immediately reusable on fresh shale.

4. A process of extracting paraffin-like waxy materials from hydrocarbon oil bearing shale which process comprises immersing the shale in a solvent bath containing ethyl alcohol and heat treating at a temperature of at least the boiling point of the solvent and extracting the waxy material by the solvent action of the alcohol alone, separating the solvent and extracted matter from the shale, cooling the resultant liquid material to effect the solidification of the wax, separating the solvent from the extracted material, the solvent being characterized by its ability to substantially completely separate from the paraffin-like wax material, when the latter cools and to thus be thereafter immediately reusable on fresh shale.

5. The process of extracting paraffin-like waxy materials from hydrocarbon oil bearing shale which process comprises immersing the shale in a pool of ethyl alcohol, subjecting the alcohol and shale to temperature sufficient to boil the alcohol and extract the waxy material by the solvent action of the alcohol alone, separating the alcohol and matter extracted thereby from the shale, cooling the resultant liquid material to effect the solidification of the wax, separating the major portion of the alcohol from the extracted material, and further removing any remaining alcohol by subjecting the extracted waxy material to a temperature sufficient to distill off any of the alcohol remaining therein, the solvent alcohol being characterized by its ability to substantially completely separate from the paraffin-like wax material, when the latter cools and to thus be thereafter immediately reusable on fresh shale.

6. The process of preparing a mineral paraffin-like waxy substance having a melting point of at least 150° F. which process comprises immersing hydrocarbon oil bearing shale containing the wax in a solvent bath, subjecting the solvent and shale to an increased temperature sufficient to boil the solvent and effect the extraction of the waxy material by the solvent action alone, separating the solvent and extracted matter from the shale, cooling the resultant liquid material to effect the solidification of the waxy material, separating the major portion of the solvent from the extracted material, and further removing any remaining solvent by subjecting the extracted waxy material to a temperature to distill off any of the solvent remaining therein, the solvent being characterized by its ability to substantially completely separate from the paraffin-like wax material, when the latter cools and to thus be thereafter immediately reusable on fresh shale.

7. The process of preparing a mineral paraffin-like waxy substance having a melting point of at least 150° F. which process comprises immersing hydrocarbon oil bearing shale containing the wax in an ethyl alcohol bath, subjecting the alcohol and shale to an increased temperature sufficient to boil the alcohol and effect the extraction of the waxy material by the solvent action of the alcohol alone, separating the alcohol and matter extracted thereby from the shale, cooling the resultant liquid material to effect the solidification of the wax, separating the major portion of the alcohol from the extracted material, and further removing any remaining alcohol by subjecting the extracted waxy material to a temperature sufficient to distill off any of the alcohol remaining therein, the solvent alcohol being characterized by its ability to substantially completely separate from the paraffin-like wax material, when the latter cools and to thus be thereafter immediately reusable on fresh shale.

8. The process of preparing mineral resin and paraffin wax which process comprises treating hydrocarbon oil bearing Nevada shale or similar shale by immersing it in an ethyl alcohol bath in a closed container at a temperature at least sufficient to boil the alcohol, drawing off the alcohol and extracted material, cooling the material, removing the alcohol from the extracted material, and separating the resin from the paraffin wax.

In testimony whereof I affix my signature.

DAVID T. DAY.